United States Patent
Bhattacharyya et al.

(10) Patent No.: US 7,600,080 B1
(45) Date of Patent: *Oct. 6, 2009

(54) AVOIDING DEADLOCKS IN A MULTIPROCESSOR SYSTEM

(75) Inventors: Binata Bhattacharyya, Bangalore (IN); Chandra P. Joshi, Bangalore (IN); Chung-Chi Wang, Sunnyvale, CA (US); Liang Yin, San Jose, CA (US); Vivek Garg, Folsom, CA (US); Phanindra K. Mannava, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 281 days.

This patent is subject to a terminal disclaimer.

(21) Appl. No.: 11/525,585

(22) Filed: Sep. 22, 2006

(51) Int. Cl.
*G06F 12/00* (2006.01)
(52) U.S. Cl. .............. 711/143; 711/118; 711/119; 711/128; 711/135; 711/141; 711/147; 711/148
(58) Field of Classification Search ......... 711/118–120, 711/141, 143–146, 147–148
See application file for complete search history.

(56) References Cited

U.S. PATENT DOCUMENTS

| | | | | |
|---|---|---|---|---|
| 6,009,488 | A | 12/1999 | Kavipurapu | 710/105 |
| 6,631,448 | B2 * | 10/2003 | Weber | 711/141 |
| 6,865,634 | B2 * | 3/2005 | McAllister | 710/240 |
| 6,938,128 | B1 * | 8/2005 | Kuskin et al. | 711/141 |
| 2002/0116586 | A1 * | 8/2002 | Tremblay et al. | 711/143 |
| 2003/0217235 | A1 * | 11/2003 | Rowlands | 711/141 |
| 2004/0068620 | A1 * | 4/2004 | Van Doren et al. | 711/144 |

OTHER PUBLICATIONS

U.S. Appl. No. 11/474,140, filed Jun. 23, 2006, entitled, "Synchronizing Control and Data Paths Traversed by A Data Transaction" by Bipin P. Singh; Vivek Garg; Binata Bhattacharyya.

* cited by examiner

*Primary Examiner*—Tuan V Thai
*Assistant Examiner*—Zhuo H Li
(74) *Attorney, Agent, or Firm*—Trop, Pruner & Hu, P.C.

(57) ABSTRACT

In one embodiment, the present invention includes a method for receiving a first memory request from a first caching agent associated with a first processor, in a home agent associated with a memory, directing the first memory request to a writeback queue of the home agent if the first memory request is a writeback request and otherwise directing the first memory request to a second queue of the home agent. In this way, circular dependencies may be avoided. Other embodiments are described and claimed.

14 Claims, 7 Drawing Sheets

AVOIDING DEADLOCKS IN A MULTIPROCESSOR SYSTEM

BACKGROUND

Many of today's computer systems are implemented using multiprocessor architectures. In such systems, multiple processing resources, such as multiple processor sockets may be present. Each socket may include one or more processor cores and cache memories, among other such components. While such systems can provide high throughput computing performance, their design includes challenges and can lead to tradeoffs that may impact performance.

For example, multiple processing resources within a single system may desire to access the same data at approximately the same time. To enable improved performance, multiple processors may store a data item in closer relation to it than a mass storage location where the data item may be located. Accordingly, many processors include cache memory to improve the performance of the processor, typically by reducing memory access latency. Processing devices that use multiple cache memory modules, such as multi-core processors, typically implement one or more techniques to maintain cache coherency. In some circumstances because of circular dependencies that may be created due to certain microarchitectural implementations in a multiprocessor system, coherency protocols can result in deadlock conditions. Such conditions prevent forward progress and can cause system hangs, reducing system performance.

DETAILED DESCRIPTION

Embodiments of the present invention may provide techniques for avoiding cache deadlock conditions in multiprocessor systems. Such techniques may enable a multiprocessor system to manage cache coherency operations in a manner that reduces the likelihood of, or prevents, deadlock conditions. In various embodiments, front end structures associated with a memory or memory controller, such as a home agent of a processor socket which may be used to track transactions for an associated memory (as described further below), may include multiple buffer structures to receive and temporarily store incoming transactions of different types to avoid circular dependencies.

In this way, deadlocks may be avoided. Specifically, when an entry in a head of a buffer of the home agent is prevented from making forward progress, entries both behind it and entries in buffer structures of other agents of that processor socket and/or another agent can become deadlocked. For example, entries in a buffer of a caching agent which may be used to communicate between a core and other processor agents (as described further below), such as may be present in a different processor socket, may be stuck behind an entry at the head of its buffer that is waiting for a return of information from an entry stuck behind the head of the buffer of the home agent. Accordingly, different transaction types, when received by a home agent or other such front end component, may be allocated to different buffer structures, avoiding a potential deadlock scenario.

Figure 1:
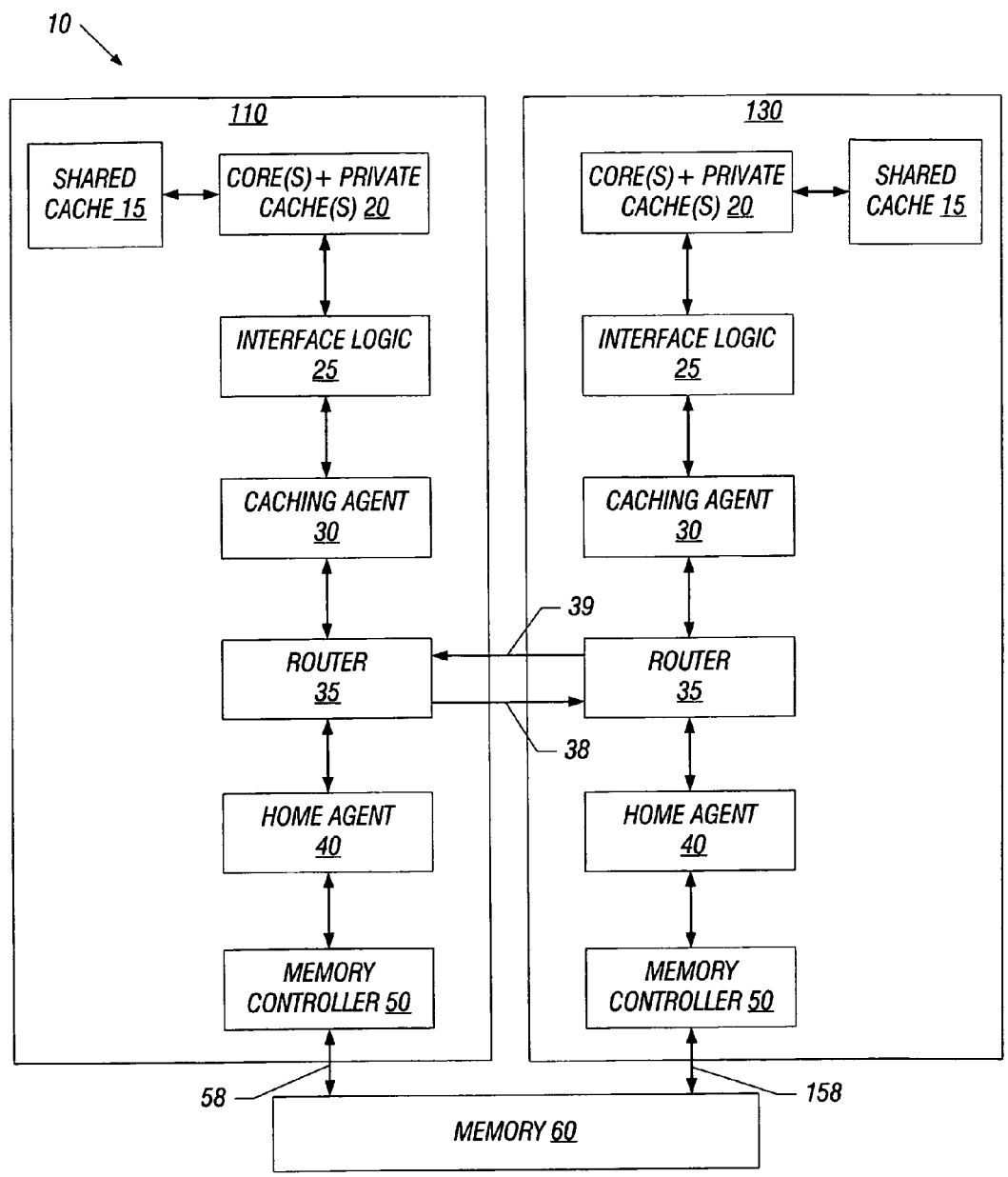
FIG. 1 is a block diagram of a system according to one embodiment of the present invention.

FIG. 1 is a block diagram of a system 10 according to one embodiment of the present invention. Referring to FIG. 1, system 10 may include one or more processor sockets 110 and 130. Each of processor sockets 110 and 130 include one or more cores 20. For purposes of discussion, it may be assumed that multiple cores 20 are present in each socket. Each core may include its own local or private cache memory, along with a local cache controller. Additionally, cores 20 may further include a global cache controller, in some embodiments. Still further, a shared cache 15 may be coupled to cores 20 to provide for shared cache storage by all cores within the processor socket. Such a cache hierarchy may be used to store frequently accessed or recently used information in close relation to the cores.

While such a cache hierarchy may provide for efficient accesses to requested information, read requests from one or more cores 20 which miss in the local caches (e.g., level 1 (L1) and level 2 (L2) caches) are sent out of processor socket 110 for memory access. Such read requests may be issued to an interface logic 25 from cores 20. Interface logic 25 may include various structures such as buffers, trackers, logic and the like. In various embodiments, interface logic 25 may be used to perform protocol translations and interface messages and other transactions (e.g., all other core initiated non-coherent writes and snoop responses for a snoop received from other processor sockets, etc.) between cores 20 and a fabric to which processor socket 110 is coupled. To maintain global coherency in a multiprocessor system, when a read request is sent to memory, a snoop request may be sent to all other peer sockets, e.g., processor socket 130. Similarly, writebacks may be issued to interface logic 25 to update memory when a line is evicted from a local cache, either by a replacement algorithm or the line is extracted by an external snoop hit. While not shown in FIG. 1 for ease of illustration, it is to be understood that read and write transactions may arrive at interface logic 25 from cores 20 in order.

Transactions may be provided from interface logic 25 to a caching agent 30. Certain coherent requests may be processed in caching agent 30, which may be used to generate and control snoop traffic. For example, caching agent 30 may receive deferred local core read and write requests/transactions for memory access. Furthermore, caching agent 30 may receive responses of snoops originating on behalf of requests from other caching agents within system 10. For each coherent read transaction, caching agent 30 may send a snoop to peer sockets (e.g., peer socket 130) through router 35. Also, caching agent 30 receives snoops from peer sockets through router 35 and forwards such snoops to the associated cores and caches. In response to a snoop, caching agent 30 receives snoop responses from local cores/caches. In addition, caching agent 30 sends request transactions (e.g., read or writes, victims/writebacks, and snoop responses along with data or non-data) from cores 20 to router 35. Router 35 may determine based on information (e.g., address information) associated with a transaction whether the transaction is directed to a location within processor socket 110 or an off-chip location. Accordingly, router 35 passes the transaction either to a home agent 40 or off-chip via an interconnect 38. In various embodiments, interconnect 38 may be a point-to-point interconnect, although the scope of the present invention is not so limited. Interconnect 38 may be coupled to various entities, for example, peer processor socket 130 or another agent via a fabric. Similarly, peer processor socket 130 is coupled to processor socket 110 via an interconnect 39.

Home agent 40 (which may also be referred to as a coherence controller) may receive coherent requests that are received from either cores 20 of processor socket 110 or from remote agents. Home agent 40 may perform various activities, including returns of requested data. Furthermore, home agent 40 may resolve access conflicts and maintain memory coherence across system 10. In various embodiments, caching agent 30 and home agent 40 may together implement a protocol layer of a given coherence protocol. Home agent 40 may include various queues and logic, among other structures to determine whether a request is for coherent data, i.e., data belonging to any memory address which can be cached by any of the processor caches or caching agents. The state of a cache line may include the indicators M,E,S,I or F for a MESIF cache coherence protocol, in which M stands for Modified, E for Exclusive, S for Shared, I for Invalid and F for Forward. Based on the determination in home agent 40, coherent path requests are provided to a memory controller 50. Memory controller 50 may be used to control transactions between processor socket 110 and one or more memories coupled thereto, e.g., via an interconnect 58. For example, a portion of system memory 60 may be locally attached to processor socket 110 via interconnect 58. Memory may be any memory such as, e.g., random access memory (RAM), dynamic random access memory (DRAM), read only memory (ROM), or combinations thereof. Note that processor socket 130 includes similar components or agents to those in processor socket 110, and may be coupled to memory 60 via an interconnect 158. While described with this particular implementation in the embodiment of FIG. 1, it is to be understood that the scope of present invention is not limited in this regard and implementation of a processor socket may vary in different embodiments.

Note that processor sockets 110 and 130 may be any processor such as a general purpose processor, a network processor that processes data communicated over a computer network, or other types of processors including a reduced instruction set computer (RISC) processor or a complex instruction set computer (CISC).

In one embodiment, caching agent 30 snoops peer processor socket 130 and uses the coherency status information to ensure global system coherency. For example, assume that one of cores 20 of processor socket 110 has a first cache unit that desires to obtain a particular data value. Furthermore, assume that one of cores 20 of processor socket 130 has a second cache unit that contains a modified version of the data value (the coherency status information indicates that the data value in the second cache unit is in the modified state).

In this example, first processor socket 110 initiates a read request to obtain the data value and snoops peer processor socket 130 and determines that it contains the modified version of the data value. Second processor socket 130 then sends a modified snoop response and delivers the modified data value to first processor socket 110 via interconnect 39. Depending on the system, the modified data value may or may not be simultaneously written to the main memory.

In another example, assume that first processor socket 110 desires to exclusively own a particular data value. Furthermore, assume that second processor socket 130 contains an unmodified, shared copy of the data value (the coherency status information indicates that the data value in second processor socket 130 is in the shared state). In this example, first processor socket 110 initiates a read request which requests data for exclusive use and also sends a snoop to second processor socket 130.

Second processor socket 130 receives the snoop request and determines that it contains a shared copy of the data value. Second processor socket 130 then invalidates its shared data value by changing the data value's coherency status information to the invalid state. Changing the data value's coherency status to the invalid state invalidates the data value within caches of second processor socket 130. First processor socket 110 then completes the read request and obtains a copy of the data value from, e.g., main memory for exclusive use.

In an alternate embodiment, caching agent 30 may implement a bus broadcasting technique to maintain global system coherency. For example, in multiple-bus systems bus transactions initiated on each bus may broadcast to other buses in the system. Similarly, in an alternate embodiment, home agent 40 may implement directory-based cache coherency methods. In directory techniques, the main memory subsystem maintains memory coherency by storing extra information with the data. The extra information in the main memory subsystem may indicate: 1) which processor or processors have obtained a copy of a data value; and 2) the coherency status of the data values. For example, the extra information may indicate that more than one processor shares the same data value. In yet another example, the extra information may indicate that only a single processor has the right to modify a particular data value.

When a processor requests a data value, the main memory subsystem may determine whether it has an up-to-date version of the data value. If not, the main memory can indicate to the requesting processor which other processor has the up-to-date data value. Further, in some implementations, peer-to-peer transfer of modified data may be performed, without updating of the memory subsystem.

In an alternate embodiment, caching agent 30 may implement a bus interconnect cache coherency technique in which coherency status information is associated with the data values which are stored in the respective caches. Different cache coherency technique(s) may be implemented by home agent 40 in different embodiments.

Figure 2:
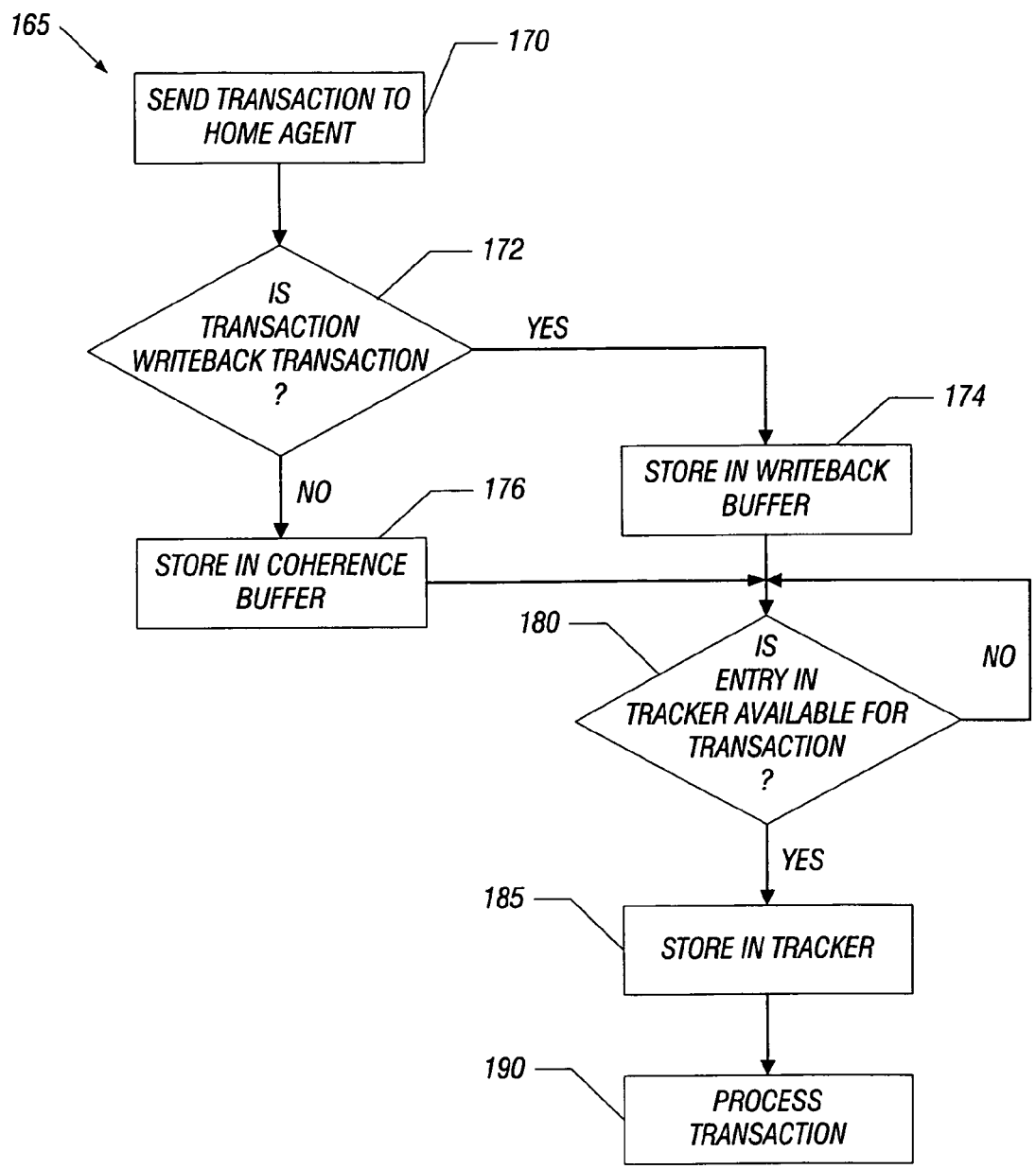
FIG. 2 is a flow diagram of a method in accordance with one embodiment of the present invention.

Referring now to FIG. 2, shown is a flow diagram of a method in accordance with one embodiment of the present invention. As shown in FIG. 2, method 165 may be implemented in a system to enable smooth flow of transactions between different system agents. With reference to FIG. 2, method 165 may begin by sending a transaction to a home agent (block 170). For example, a caching agent of a first processor socket may send various transactions to a home agent of a second processor socket. Such transactions may correspond to, for example, read requests, snoop requests, or writeback requests to writeback data, e.g., evicted from a cache of the first processor socket.

When received by the second processor socket, and more particularly the home agent of the second processor socket, it may be determined whether the transaction is a writeback transaction (decision diamond 172). That is, it may be determined whether the transaction is a writeback request for data that was modified or otherwise evicted from the first processor socket. If so, control passes to block 174, where the transaction may be stored in a writeback buffer of the home agent. This writeback buffer may temporarily store incoming writeback transactions until they are allocated into other pipeline structures of the home agent, such as a tracker structure.

Note if instead at decision diamond 172 it is determined that the transaction is not a writeback transaction, control passes to block 176. At block 176, the transaction may be stored in a coherence buffer. That is, a different buffer structure of the home agent may store non-writeback transactions, such as read requests or snoop requests, among other such requests. As with the writeback buffer, the coherence buffer may temporarily store entries until they are allocated into other pipeline structures, such as a tracker.

Referring still to FIG. 2, from both block 174 and block 176, control passes to decision diamond 180. At decision diamond 180, it may be determined whether an entry is available in a tracker for the given transaction. If not, decision diamond 180 loops back on itself. If such an entry is available in the tracker, control passes to block 185, where the transaction may be stored in the tracker. Note that the tracker may be a content addressable memory (CAM) storage that is used to track pending transactions out to a memory associated with the home agent until such transactions complete. By providing separate buffers as inputs into the tracker, transactions of different types may avoid suffering blocking during processing.

Referring still to FIG. 2, when an entry is allocated in the tracker for a given transaction, control passes to block 190 where the transaction may be processed. For example, the requested action is passed along pipeline stages leading to the memory. As one example, various schedulers and other structures may process the transaction to enable the desired operation to take place, such as obtaining data, storing data, determining a state of data and so forth. While shown with this particular implementation in the embodiment of FIG. 2, it is to be understood the scope of the present invention is not limited in this regard and variations are possible. Note that while not shown in FIG. 2, additional steps to provide the transaction's results back to the entry in the tracker, and then from the home agent back to the requesting agent, such as a caching agent of another processor socket, may take place.

Figure 3:
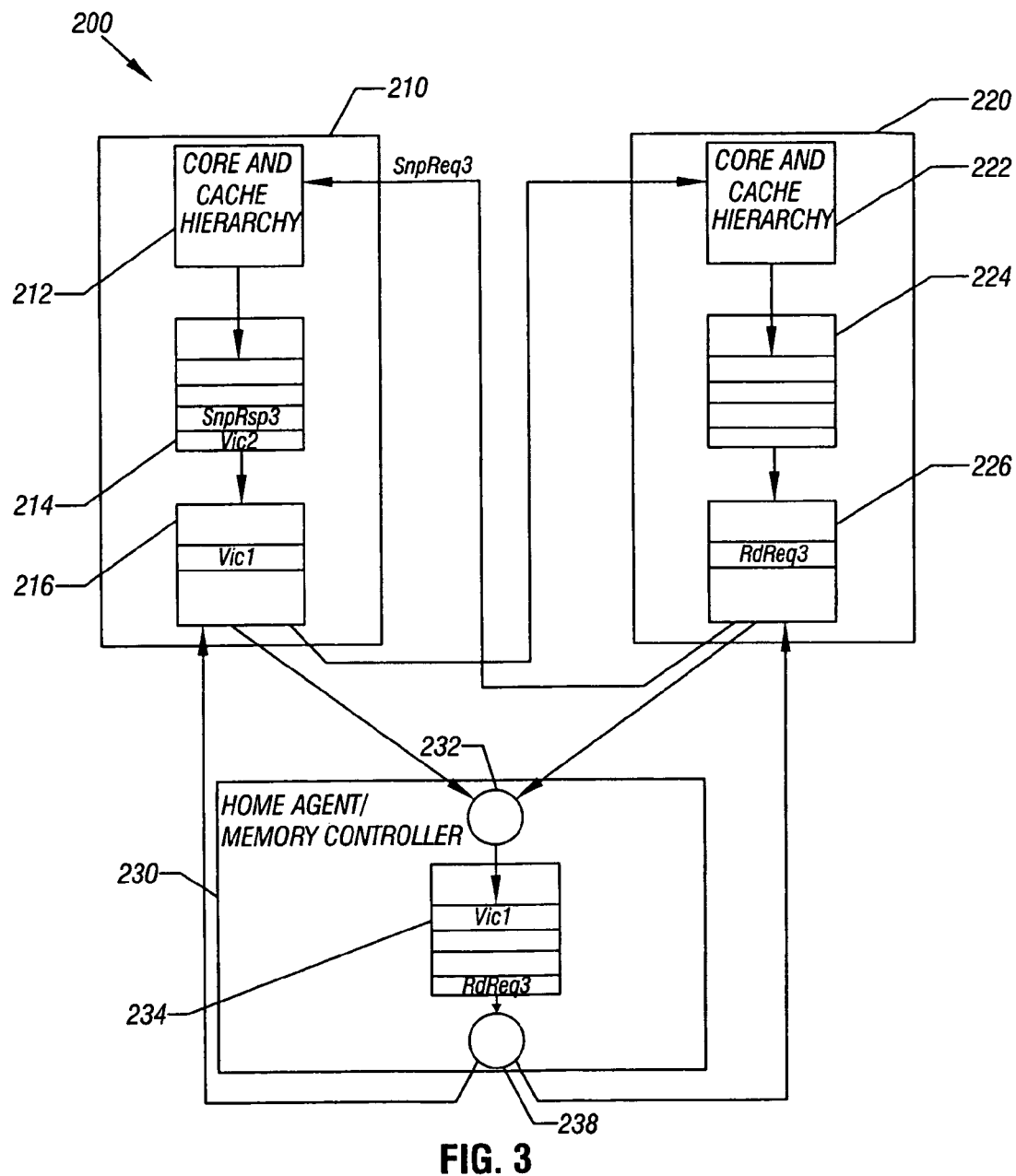
FIG. 3 is an illustration of a deadlock scenario in a multiprocessor system.

Referring now to FIG. 3, shown is an illustration of a deadlock scenario in a multiprocessor system. Aspects of the operation of system 200 will be explained with reference to FIG. 3. Structural features of the system 200 unrelated to the functionality explained with reference to FIG. 3 are omitted for clarity. As shown in FIG. 3, which explains the deadlock scenario, multiprocessor system 200 includes a first block 210 in a first processor socket, a second block 220 in a second processor socket, and a home agent and memory controller 230 (hereafter home agent 230), which may also be present in the first processor socket. First block (also referred herein as first central processing unit (CPU) block) 210 includes a processing core and cache hierarchy module 212 (hereafter core 212) and a caching agent which includes an ingress first-in-first-out (FIFO) queue, referenced herein as IFX 214 and a content addressable memory (CAM) array, which is referenced herein as system request tracker (SRT) 216. SRT 216 may be used to keep track of outstanding requests sent to home agent 230. Messages (reads, writes or snoop responses) coming from local cores are arbitrated for allocation into SRT 216 to meet protocol ordering requirements per physical address from each source to destination. Thus messages from local cores may be queued in IFX 214 to wait for their turn to arbitrate for SRT 216. Because SRT 216 is a CAM array in one embodiment, the physical address of each incoming messages is compared with the physical address of already allocated messages in SRT 216 so that at the same time only one message per physical address can be allocated in SRT 216 and also only one message per physical address is sent out from each caching agent to home agent 230. While not shown in FIG. 3, in some implementations the caching agent may also include a CAM array at its front end (i.e., in front of IFX 214) to avoid blocking of subsequent transactions if not for the same physical address.

Similarly, second block 220 includes a processing core and cache hierarchy module 222 (hereafter core 222), a caching agent including an ingress FIFO queue, which is referred to herein as IFX 224, and a CAM array to keep track of outstanding requests sent to home agent 230, which is referred to as SRT 226.

As further shown in FIG. 3, home agent 230 includes an input buffer 232, a FIFO queue referred to herein as a coherence queue (CohQ) 234, and an output buffer 238. Transactions are issued from CohQ 234 to memory, and completions (CMPs) and data are sent to the requesting caching agent when the transactions are complete. In one embodiment, CohQ 234 may be implemented as FIFO. In this way, transaction ordering per physical address from source (e.g., caching agent) to destination (e.g., memory) as required by a coherency protocol may be met.

During operation, CPU block 220 may generate a read request (RdReq3), which is transmitted to home agent 230 and also stored in SRT 226, and may further generate a corresponding snoop request (SnpReq3), which is transmitted to CPU block 210, substantially contemporaneously with the read request. In home agent 230, the read request may be directed to coherence queue 234.

Also during operation, a cache line is evicted from core 212 of CPU block 210 and thus a first write transaction (Vic1) is generated. The write transaction Vic1 may traverse IFX 214 and be allocated into SRT 216. Vic1 may then be transmitted from SRT 216 to home agent 230. The write transaction Vic1 is received by home agent 230, and is allocated in CohQ 234 behind RdReq3. Because in the embodiment of FIG. 3, CohQ 234 is a FIFO, the write transaction Vic1 can be issued to memory only after the RdReq3 is deallocated from the head of CohQ 234. Thus although Vic1 and RdReq3 are unrelated transactions (i.e., of different physical addresses), still Vic1 is blocked behind RdReq3 in CohQ 234.

Assume further that during operation, another cache line is evicted from core 212 of CPU block 210 and thus a second write transaction (Vic2) is generated. The write transaction Vic2 waits in IFX 214 for write transaction Vic1 to be completed, as SRT 216 is already full. That is, because SRT 216 is implemented in one embodiment as a CAM, it may have one dedicated entry for a writeback message, which is full with Vic1, as Vic1 remains in SRT 216 waiting for a completion notification from home agent 230.

In response to the snoop request (SnpReq3), CPU block 210 may review the cache hierarchy and generate a snoop response (SnpRsp3), which is sent to IFX 214. Because write transaction Vic2 is already waiting in the head of IFX 214, SnpRsp3 waits in IFX 214 behind Vic2.

The point to be noted here is that home agent 230 keeps one single FIFO, i.e., CohQ 234, for all read and writeback messages from caching agents to maintain ordering requirements for a given protocol. But even though RdReq3 and Vic1 are of different physical addresses, Vic1 has to wait for RdReq3 in the head of CohQ 234 to be deallocated. But RdReq3 is waiting for SnpResp3, which is stuck behind the writeback transaction, Vic2, in IFX 214 in CPU block 210. Thus a circular dependency may be created, which creates a deadlock in system 200.

Figure 4:
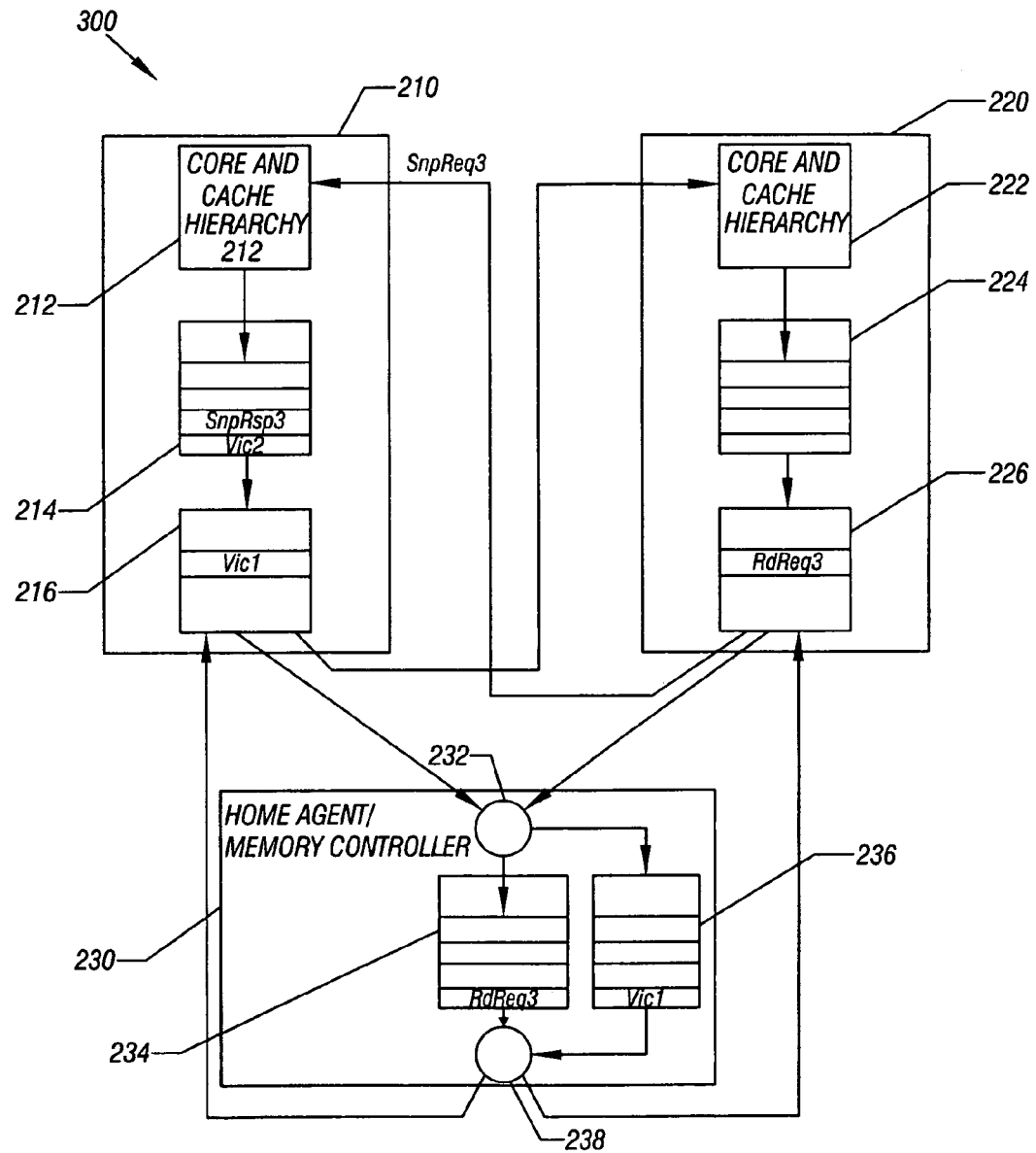
FIG. 4 is a block diagram of a system in accordance with an embodiment of the present invention that shows flow of transactions through the system.
Figure 5:
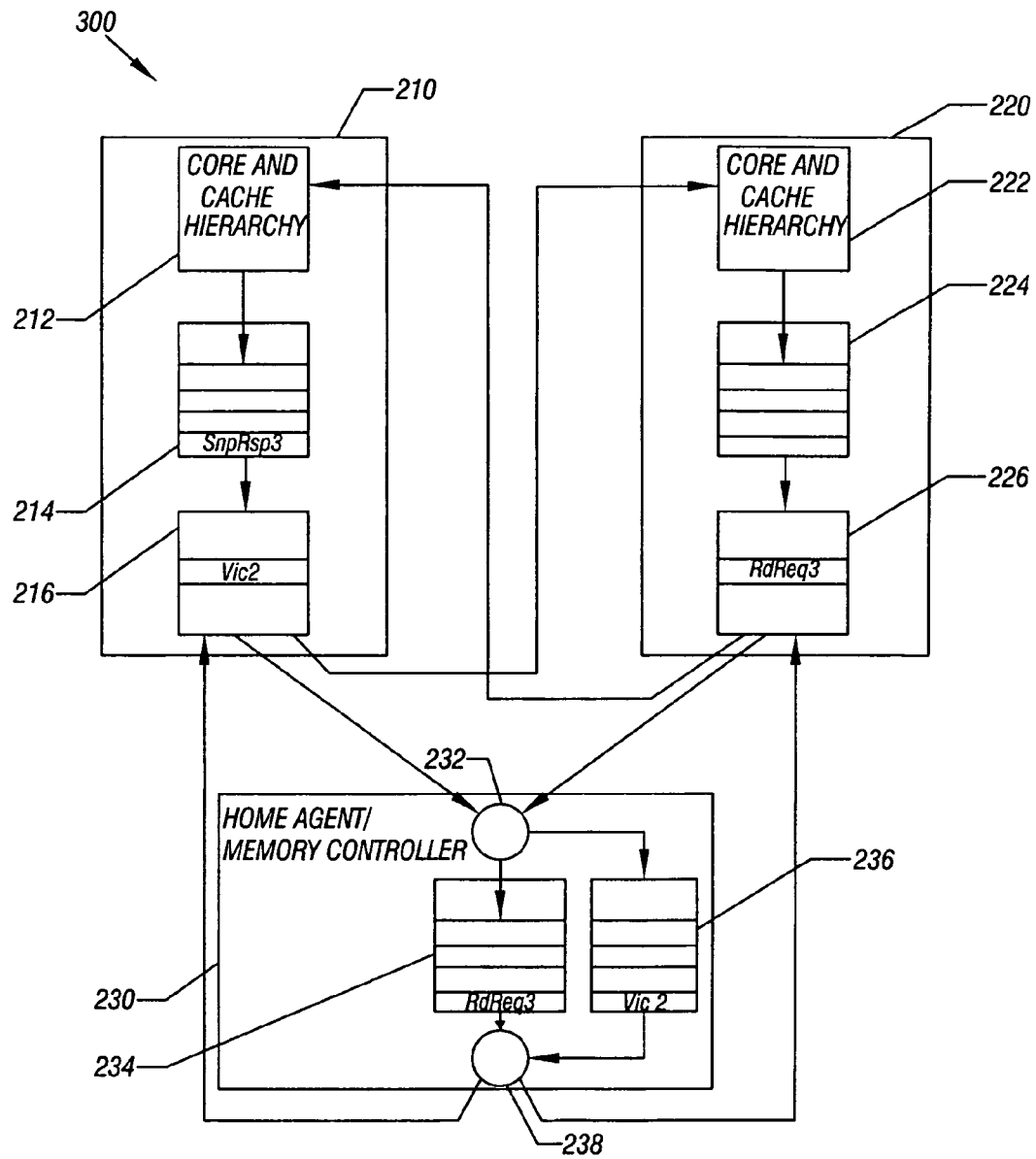
FIG. 5 is a block diagram of a system in accordance with an embodiment of the present invention that shows flow of more transactions through the system.
Figure 6:
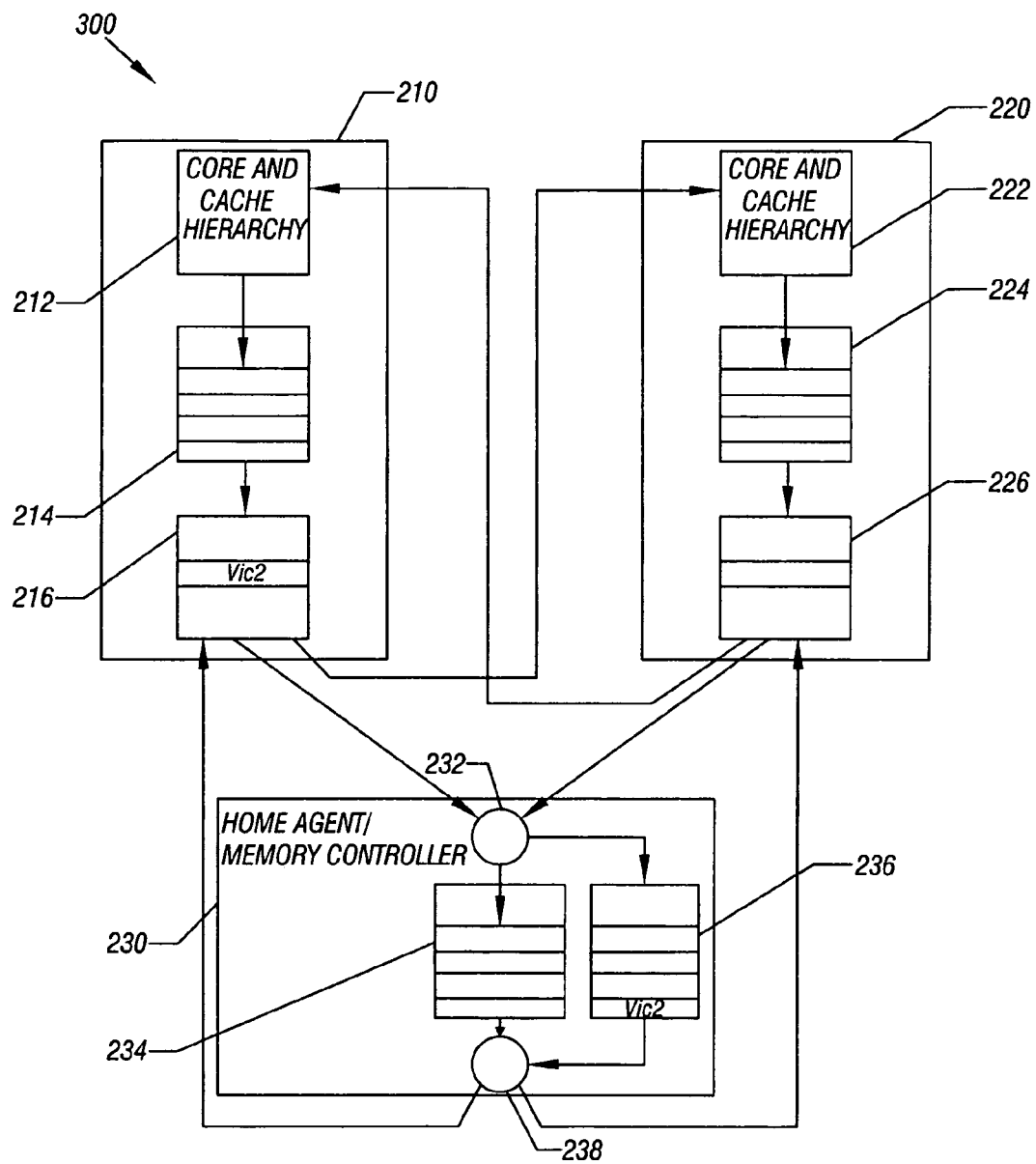
FIG. 6 is a block diagram of a system in accordance with an embodiment of the present invention that shows flow of still further transactions through the system.

FIGS. 4-6 are functional illustrations of a multiprocessor system 300 in accordance with an embodiment of the present invention for avoiding cache deadlock conditions. FIGS. 4-6 are used to illustrate transaction flow and a technique which may provide a cost effective solution to avoiding the deadlock scenario illustrated in FIG. 3 in accordance with an embodiment of the present invention.

Referring to FIG. 4, shown is a block diagram of a system in accordance with an embodiment of the present invention. As shown in FIG. 4, system 300 includes the same structures as FIG. 3, except that home agent 230 includes a separate queue for writeback transactions, specifically a coherence writeback queue (CohWbQ) 236. In this way, writebacks are not blocked by unrelated (i.e., of different physical addresses) read requests. This independence between writeback and other memory transactions may be realized as in certain protocols, there is no ordering requirement between two transactions/messages having different physical addresses. During operation, whenever a read transaction is received by home agent 230, it is issued to CohQ 234. Whenever a write transaction is received by home agent 230, and logic in the home agent 230 recognizes the write transaction as a writeback cache request, the transaction is directed to coherence writeback queue 236. So, similar to the flow described in FIG. 3, when RdReq3 is received in home agent 230, it is allocated into CohQ 234. When the write transaction Vic1 is received in home agent 230, logic recognizes the write transaction as a writeback cache request and directs that to CohWbQ 236 so that write transaction Vic1 is not blocked by unrelated read request RdReq3. Thus the write transaction Vic1 may be issued to memory, e.g., memory 60 of FIG. 1 through memory controller 50 of FIG. 1. Accordingly, conflict cases may be avoided.

Referring now to FIG. 5, when the first write transaction (Vic1) completes, home agent 230 receives an acknowledgment from memory indicating completion of the write transaction. In response, home agent 230 transmits a completion notification to CPU block 210 for the write operation Vic1. Vic1 may then be deallocated from SRT 216 and the write transaction Vic2 may be allocated to SRT 216 and sent to home agent 230.

The write transaction Vic2 is received by home agent 230, and logic in the home agent 230 recognizes the write transaction Vic2 as a writeback cache request, and directs Vic2 to coherence writeback queue 236. The write transaction Vic2 may be sent to memory such as, e.g., main memory 60 depicted in FIG. 1.

Next, the snoop response (SnpRsp3), which does not need to be allocated in SRT 216, is sent to home agent 230. Home agent 230 receives SnpRsp3 and associates the snoop response with the corresponding read request in CohQ 224. Home agent 230 may then read the data associated with the read request (RdReq3) from memory, e.g., main memory 60 depicted in FIG. 1 based on the coherency state of the snoop response.

Referring now to FIG. 6, the read request (RdReq3) may be deallocated from CohQ 234, and the data for RdReq3 may be sent to CPU block 220. The read request RdReq3 may be deallocated from SRT 226. Data for the write transaction Vic2 may be written in memory such as memory 60 of FIG. 1 and a completion notification may be sent to CPU block 210. The write transaction Vic2 may be deallocated from CohWbQ 236 (not shown in FIG. 6). Home agent 230 may then send a completion notification to CPU block 210 and Vic2 may be deallocated from SRT 216 (not shown in FIG. 6). Thus, by directing writeback cache requests into a first FIFO queue in home agent 230 and cache resource requests into a second FIFO queue in home agent 230, a circular dependency that increases the likelihood of a cache deadlock can be avoided.

Figure 7:
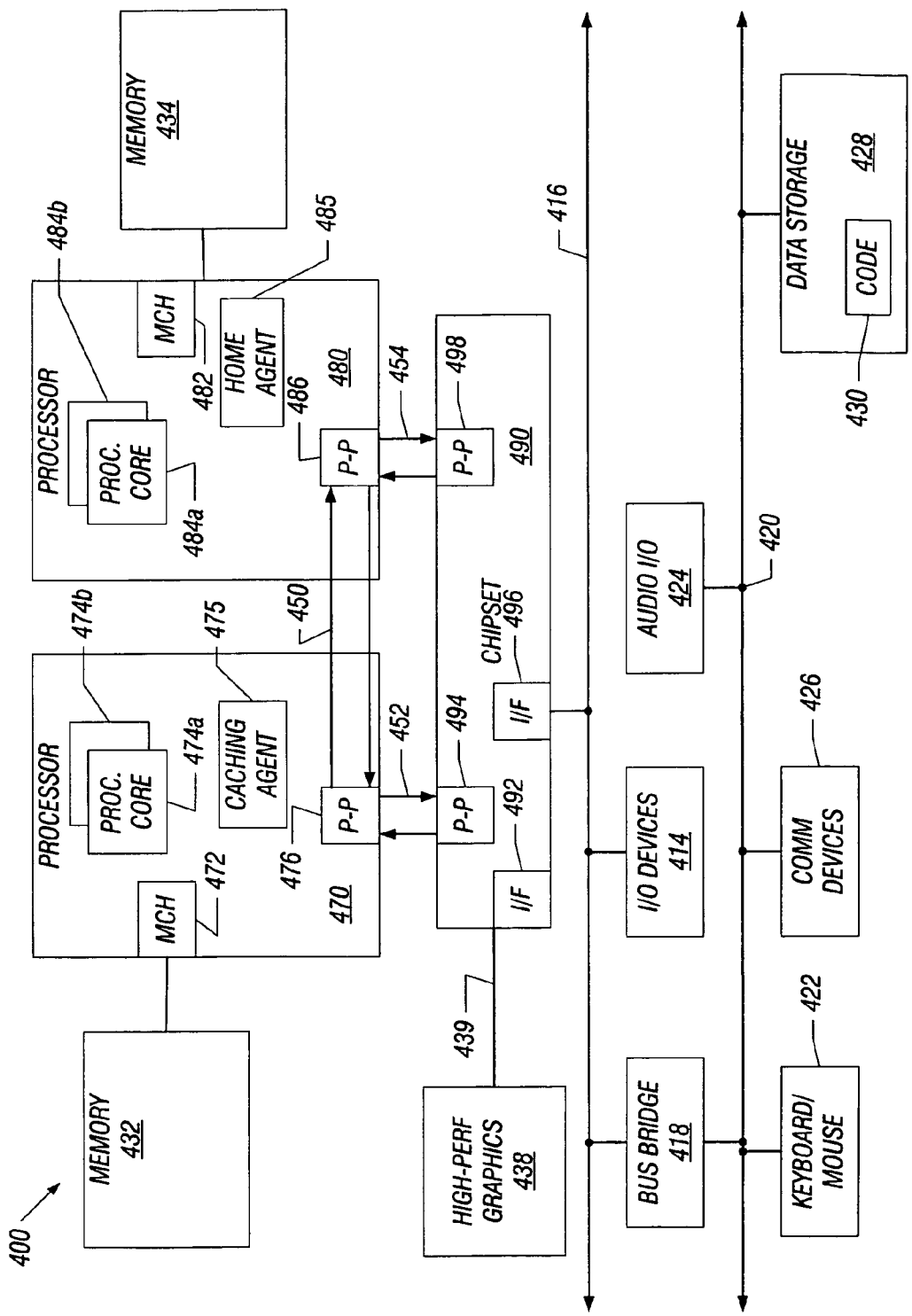
FIG. 7 is a block diagram of a multiprocessor system in accordance with an embodiment of the present invention.

Embodiments may be implemented in many different system types. Referring now to FIG. 7, shown is a block diagram of a multiprocessor system in accordance with an embodiment of the present invention. As shown in FIG. 7, multiprocessor system 400 uses a point-to-point interconnect system. A first processor 470 and a second processor 480 are coupled via a point-to-point interconnect port 450. As shown in FIG. 7, each of processors 470 and 480 may be multicore processors, including first and second processor cores (i.e., processor cores 474a and 474b and processor cores 484a and 484b). First processor 470 includes a caching agent 475 and second processor 480 includes a home agent 485. While shown with these agents for illustration, it is to be understood that each processor may include both a home agent and a caching agent. Caching agent 475 may communicate requests to home agent 485. Home agent 485 may include multiple buffers, among other structures and logic to enable the independent buffering and tracking of transactions of different types (e.g., writeback requests and other memory requests) to avoid deadlock situations. First processor 470 further includes a memory controller hub (MCH) 472 and a point-to-point (P-P) interface 476. Similarly, second processor 480 includes a MCH 482 and a P-P interface 486. As shown in FIG. 7, MCH's 472 and 482 couple the processors to respective memories, namely a memory 432 and a memory 434.

A physical layer contains ports to connect processors 470 and 480 to an external chip, e.g., a chipset 490, and a routing layer routes processor packets to targets through the physical ports. First processor 470 and second processor 480 may be coupled to chipset 490 via P-P interconnect ports 452 and 454, respectively. As shown in FIG. 7, chipset 490 includes P-P interfaces 494 and 498. Furthermore, chipset 490 includes an interface 492 to couple chipset 490 with a high performance graphics engine 438. In one embodiment, a point-to-point interconnect 439 may couple these components. In turn, chipset 490 may be coupled to a first bus 416 via an interface 496.

As shown in FIG. 7, various input/output (I/O) devices 414 may be coupled to first bus 416, along with a bus bridge 418, which couples first bus 416 to a second bus 420. Second bus 420 may be a low pin count (LPC) bus. Various devices may be coupled to second bus 420 including, for example, a keyboard/mouse 422, communication devices 426 and a data storage unit 428 which may include code 430, in one embodiment. Further, an audio I/O 424 may be coupled to second bus 420. Note that other architectures are possible. For example, instead of the point-to-point architecture of FIG. 7, a system may implement a multi-drop bus or another such architecture.

Embodiments may be implemented in code and may be stored on an article such as a machine-readable storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

receiving, in a home agent via a router, a first memory request from a first caching agent associated with a first processor socket if the first memory request is directed to a location within the first processor socket and otherwise passing the first memory request to a second processor socket from the router;

directing the first memory request to a writeback queue of the home agent if the first memory request is a writeback request, the writeback queue to store only writeback transactions;

directing the first memory request to a second queue of the home agent if the first memory request is not a writeback request;

sending the writeback request from the writeback queue to a memory;

receiving, in the home agent from the memory, an acknowledgment message indicating completion of the writeback request;

deallocating the writeback request from the writeback queue of the home agent;

sending an acknowledgment message indicating completion of the first memory request from the home agent to the first caching agent; and deallocating the first memory request from a tracker of the first caching agent responsive to the acknowledgment message, wherein only a single message per address is to be allocated into the tracker.

2. The method of claim 1, further comprising:

generating, in the first caching agent, a second memory request; and storing the second memory request in a buffer of the first caching agent until the first memory request is deallocated from the tracker, and then allocating the second memory request to the tracker, wherein the second memory request comprises a writeback request.

3. The method of claim 1, further comprising:

generating a read request in a second caching agent associated with the second processor socket and forwarding the read request to the home agent;

transmitting, substantially contemporaneously with the read request, a snoop request corresponding to the read request from the second caching agent to the first caching agent; and receiving a snoop response corresponding to the snoop request in the home agent from the first caching agent and associating the snoop response with the read request.

4. The method of claim 3, further comprising directing the snoop response to the second queue.

5. The method of claim 1, further comprising maintaining the writeback queue independent of the second queue.

6. An apparatus comprising:

a first processor socket including a first core, a first cache memory, a first caching agent, a router to couple to the first caching agent to a home agent and to a second router of a second processor socket, the router to direct memory requests from the first caching agent to the home agent if directed to a location within the first processor socket and otherwise to the second router, the home agent including a first storage to store memory requests from the first caching agent and a second caching agent of the second processor socket and a second storage to store only writeback requests from the first caching agent and the second caching agent, wherein the home agent is to direct a writeback request from the first caching agent into the second storage, deallocate the writeback request from the second storage after receipt of an acknowledgment message indicative of completion of the writeback request in a memory coupled to the home agent, and the first caching agent is to deallocate the writeback request from a tracker of the first caching agent responsive to an acknowledgment message indicative of the deallocation from the second storage.

7. The apparatus of claim 6, wherein the first caching agent is to store a second memory request in a buffer of the first caching agent until the acknowledgment message is received in the first caching agent.

8. The apparatus of claim 6, wherein the second caching agent is to generate a read request and transmit, substantially contemporaneously with the read request, a corresponding snoop request to the first caching agent, and the first caching agent is to transmit a snoop response to the home agent responsive to the snoop request.

9. The apparatus of claim 8, wherein the home agent is to direct the snoop response to the first storage.

10. The apparatus of claim 8, wherein the home agent is to issue the read request to the memory after receipt of the snoop response from the first caching agent.

11. The apparatus of claim 10, wherein the home agent is to deallocate the read request from the first storage after receipt of data from the memory, and transmit the data to the second caching agent.

12. A system comprising:

a first processor socket having a first processing unit, a first memory, a first caching agent, and a home agent including a first queue to store memory requests and a second queue to store only writeback requests, wherein the home agent is to receive a writeback request from the first caching agent and direct the writeback request into the second queue and to deallocate the writeback request from the second queue after completion of a writeback and send an acknowledgement of the completion to the first caching agent, which in turn is to deallocate the writeback request from a tracker of the first caching agent;

a second processor socket coupled to the first processor socket having a second processing unit, a second memory, and a second caching agent; and a dynamic random access memory (DRAM) coupled to the first processor socket.

13. The system of claim 12, wherein the home agent is to receive a read request from the second caching agent and direct the read request into the first queue.

14. The system of claim 13, wherein the home agent is to maintain information in the first queue independent of information in the second queue to avoid a circular dependency.

* * * * *

UNITED STATES PATENT AND TRADEMARK OFFICE
CERTIFICATE OF CORRECTION

PATENT NO.      : 7,600,080 B1
APPLICATION NO. : 11/525585
DATED           : October 6, 2009
INVENTOR(S)     : Bhattacharyya et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 295 days.

Signed and Sealed this

Fifth Day of October, 2010

David J. Kappos
*Director of the United States Patent and Trademark Office*